United States Patent
Balasubramaniam et al.

(10) Patent No.: US 8,780,775 B2
(45) Date of Patent: Jul. 15, 2014

(54) METHOD AND DEVICE FOR REDUCING POWER DRAIN WHILE CAMPED ON A WIRELESS LOCAL AREA NETWORK

(75) Inventors: Sankaran C. Balasubramaniam, Bangalore (IN); Mahesh Perepa, Bangalore (IN)

(73) Assignee: Intel Corporation, Santa Clara, CA (US)

(*) Notice: Subject to any disclaimer, the term of this patent is extended or adjusted under 35 U.S.C. 154(b) by 531 days.

(21) Appl. No.: 13/070,518

(22) Filed: Mar. 24, 2011

(65) Prior Publication Data
US 2011/0292853 A1 Dec. 1, 2011

Related U.S. Application Data

(60) Provisional application No. 61/349,264, filed on May 28, 2010.

(51) Int. Cl.
| | |
|---|---|
| G08C 17/00 | (2006.01) |
| H04M 1/00 | (2006.01) |
| H04B 1/38 | (2006.01) |
| H01Q 11/12 | (2006.01) |
| H04B 1/04 | (2006.01) |
| H04B 1/16 | (2006.01) |
| H04W 52/02 | (2009.01) |
| H04W 52/00 | (2009.01) |

(52) U.S. Cl.
CPC ...... *H04W 52/0245* (2013.01); *H04W 52/0248* (2013.01); *H04W 52/00* (2013.01)
USPC ..... 370/311; 455/574; 455/127.5; 455/343.2; 455/343.5

(58) Field of Classification Search
CPC .................. H04W 52/0245; H04W 52/0248; H04W 52/0225; H04W 52/00; H04W 52/02; H04W 52/0209; H04W 52/0251; H04W 52/0216
USPC ......... 370/311; 455/574, 127.5, 343.3, 127.1, 455/260, 343.2, 343.5
See application file for complete search history.

(56) References Cited

U.S. PATENT DOCUMENTS

| | | | | |
|---|---|---|---|---|
| 4,777,655 | A | * | 10/1988 | Numata et al. ................... 455/76 |
| 4,903,319 | A | * | 2/1990 | Kasai et al. ..................... 455/574 |

(Continued)

FOREIGN PATENT DOCUMENTS

| | | | |
|---|---|---|---|
| EP | 0 812 119 A2 | * 12/1997 | .............. H04Q 7/32 |
| EP | 0812119 A2 | 12/1997 | |

(Continued)

OTHER PUBLICATIONS

3GPP TR 36.921, "3rd Generation Partnership Project; Technical Specification Group Radio Access Networks; Evolved Universal Terrestrial Radio Acces (E-UTRA); FDD Home eNodeB (HeNB) Radio Frequency (RF) requirements analysis (Release 9)", Dec. 2009, 3GPP, all pages.*

*Primary Examiner* — Kwang B Yao
*Assistant Examiner* — Adam Duda
(74) *Attorney, Agent, or Firm* — Schwabe, Williamson & Wyatt, P.C.

(57) ABSTRACT

A device (200) and method (300) of saving energy in a wireless communication device (200) capable of running on a wide area network and a local area network, are disclosed. The method (300) can include: operating (310) on a wide area network and a local area network, defining an active mode, wherein neighbor cell measurements are made at a first scanning interval; detecting (320) conditions to transition to a dormant mode, by: a) operating on the local area network, b) entering a scheduled quiet time, and c) determining a quality of service from the local area network meets a predetermined threshold; and transitioning (330) to a dormant mode wherein the neighbor cell measurements are made at a second scanning interval, reduced from the first scanning interval.

18 Claims, 3 Drawing Sheets

(56) References Cited

U.S. PATENT DOCUMENTS

| | | | |
|---|---|---|---|
| 5,027,428 A * | 6/1991 | Ishiguro et al. | 340/7.35 |
| 5,031,231 A * | 7/1991 | Miyazaki | 455/574 |
| 5,265,270 A * | 11/1993 | Stengel et al. | 455/343.2 |
| 5,293,693 A * | 3/1994 | Nelson et al. | 33/1 R |
| 5,471,655 A * | 11/1995 | Kivari | 455/127.5 |
| 5,884,196 A * | 3/1999 | Lekven et al. | 455/574 |
| 6,385,460 B1 | 5/2002 | Wan | |
| 6,985,758 B2 | 1/2006 | Rankin | |
| 2006/0111062 A1 * | 5/2006 | Cunningham et al. | 455/152.1 |
| 2008/0207251 A1 * | 8/2008 | Anderson | 455/522 |

FOREIGN PATENT DOCUMENTS

| | | |
|---|---|---|
| EP | 1146756 A1 | 10/2001 |
| EP | 1806936 A2 | 7/2007 |

\* cited by examiner

METHOD AND DEVICE FOR REDUCING POWER DRAIN WHILE CAMPED ON A WIRELESS LOCAL AREA NETWORK

BACKGROUND

1. Field

The present disclosure is directed to a method and device for reducing power drain while camped on a wireless local area network.

2. Description of Related Art

Presently, a wireless communication device can receive service using unlicensed mobile access services. For example, wireless communication devices can receive service from wireless local area network services that utilize technology such as eNodeB network technology, pico cell network technology, Bluetooth technology, 802.11 technology, ad hoc wireless local area network technology, infrared technology, or any other wireless local area network technology.

When a wireless communication device is on a wireless local area network, even when there is no dedicated connection, such wireless communication devices are designed and required to perform measurements of neighboring cells. These require consumption of power. These are needed for the wireless communication devices to reselect.

There is a need to minimize unnecessary power drain. Thus, there is a need to optimize and reduce unnecessary power drain of a wireless communication device without compromising on the performance.

It would be considered an improvement in the art, if when a wireless communication device is camped on a local area network, enters a scheduled quiet time and the quality of service meets a predetermined threshold, neighbor cell measurements could be made at a reduced scanning interval. When these three criteria are met, reducing a scanning interval could help to minimize unnecessary power drain of a wireless communication device and prolong the useful battery life of such a device.

Thus, there is a need for a method and device for minimizing unnecessary power drain and extending battery life in connection with wireless communication devices.

BRIEF DESCRIPTION OF THE DRAWINGS

The embodiments of the present disclosure will be described with reference to the following figures, wherein like numerals designate like elements, and wherein.

DETAILED DESCRIPTION

Figure 1:
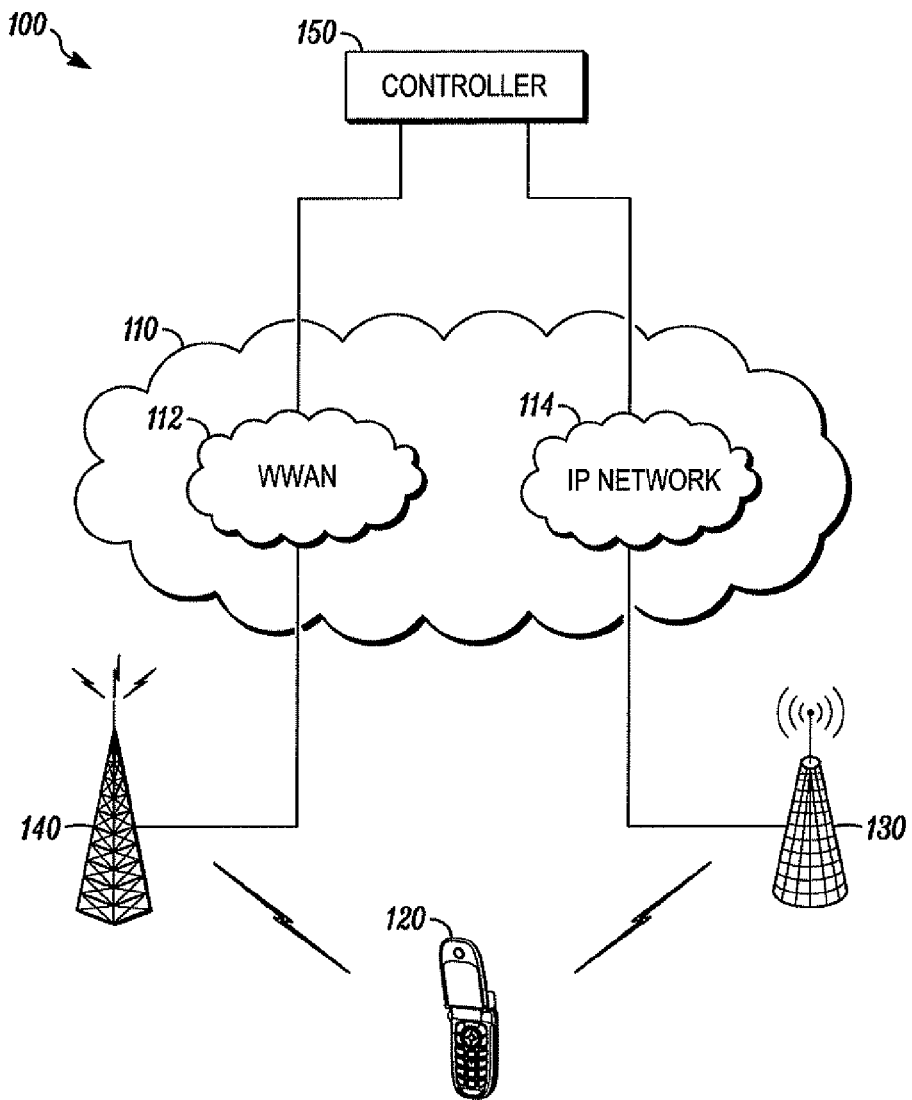
FIG. 1 is an exemplary block diagram of a system according to one embodiment.

FIG. 1 is an exemplary block diagram of a system 100 according to one embodiment. The system 100 can include a network 110, a terminal 120, an access point 130, a base station 140, and a controller 150, such as an unlicensed mobile access network controller. The terminal 120 may be a wireless communication device, such as a wireless telephone, a cellular telephone, a personal digital assistant, a pager, a personal computer, a selective call receiver, or any other device that is capable of sending and receiving communication signals on a network including wireless network. The terminal 120 can include a mode management module, as detailed in connection with FIG. 2.

In an exemplary embodiment, the access point 130 can be an access point for a wireless local area network. The wireless local area network can include a Bluetooth network, a home eNodeB network, a home nodeB network, a pico cell, an 802.11 network, an infrared network, or any other wireless local area network. The base station 140 can provide access to a wireless wide area network 112, such as a global system for mobile communication network, a time division multiple access network, a cellular network, a code division multiple access network, or any other wireless wide area network. The access point 130 can provide access to an internet protocol network 114. The network 110 may also include any type of network that is capable of sending and receiving signals, such as wireless signals. As a further example, the network 110 may include a wireless telecommunications network, a cellular telephone network, a satellite communications network, and other like communications systems. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals.

In operation, the terminal 120 can be connected to the access point 130 using a wireless local area network connection. The access point 130 can provide access to the IP network 114, such as the Internet. Using this access point 130, the terminal 120 has access to the Internet and can then connect to an unlicensed mobile access network controller such as the controller 150, for example. The terminal 120 can establish a transport or transmission control protocol connection with the controller 150 through the IP network 114. This connection can be secured using Internet protocol security. The terminal 120 can include a mode management module 290, as detailed below, to help minimize unnecessary power drain in a wireless communication device or terminal 120.

Figure 2:
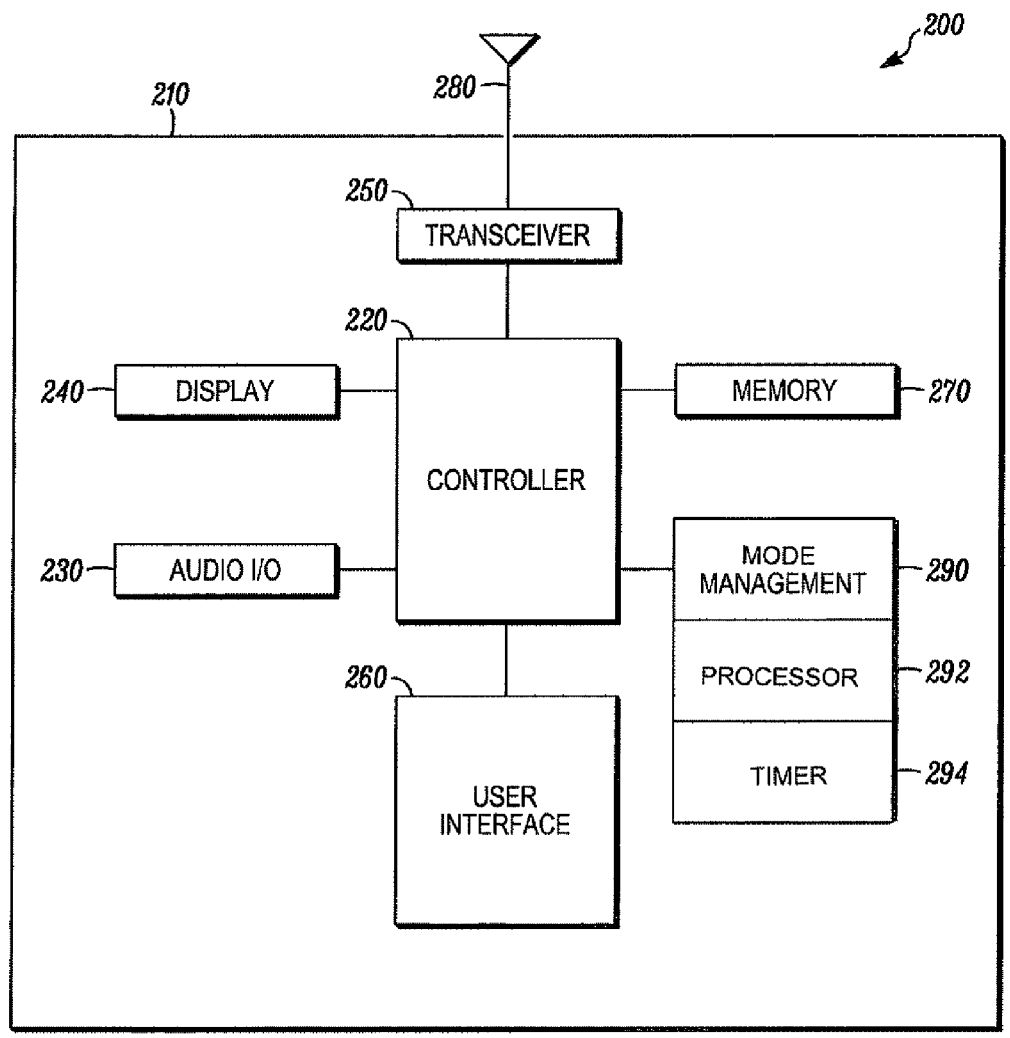
FIG. 2 is an exemplary block diagram of a wireless communication device according to one embodiment.

FIG. 2 is an exemplary block diagram of a wireless communication device 200, such as the terminal 120, according to one embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, and an antenna 280 coupled to the housing 210 and the transceiver 250. The wireless communication device 200 can also include a mode management module 290, a processor 292 and a timer 294. The mode management module 290, the processor 292 and the timer 294, can be coupled to the controller 220, can reside within the controller 220, can reside within the memory 270, can be autonomous modules, can be software, can be hardware, or can be in any other format useful for a module on a wireless communication device 200.

The display 240 can be a liquid crystal display (LCD), a light emitting diode (LED) display, a plasma display, or any other means for displaying information. The transceiver 250 may include a transmitter and/or a receiver. The transceiver 250 may be configured to send and receive signals on a wireless wide area network, a wireless local area network, or any other wireless network. Also, the transceiver 250 may include more than one transceiver, where one transceiver may be configured to operate on a wireless wide area network and another transceiver may be configured to operate on a wireless local area network.

The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory, a subscriber identity module memory, or any other memory that can be coupled to a wireless communication device.

Figure 3:
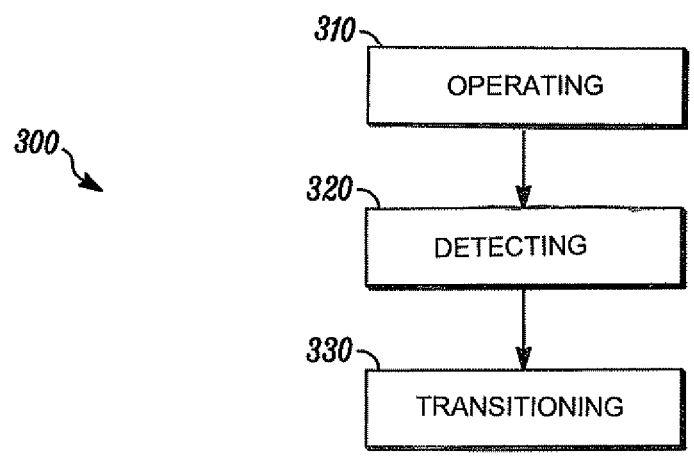
FIG. 3 is an exemplary flowchart illustrating the operation of a wireless communication device according to one embodiment.

A method of saving energy in a wireless communication device capable of running on a wide area network and a local area network, is shown in the flow diagram in FIG. 3. The method 300 can include: operating 310 on a wide area network and a local area network, defining an active mode, wherein neighbor cell measurements are made at a first scanning interval; detecting 320 conditions to transition to a dormant mode, by: a) operating on the local area network, b) entering a scheduled quiet time, and c) determining a quality of service from the local area network meets a predetermined threshold; and transitioning 330 to a dormant mode wherein the neighbor cell measurements are made at a second scanning interval, reduced from the first scanning interval. Advantageously, in operation, when a wireless communication device is camped on a local area network, enters a scheduled quiet time and the quality of service meets a predetermined threshold, neighbor cell measurements can be made at a reduced scanning interval. When these three criteria or conditions are met, Applicant's invention helps to minimize unnecessary power drain of a wireless communication device and prolong the useful battery life of such a device, due to entering into a dormant mode.

In a preferred embodiment, the local area network is wireless and comprises at least one of a home eNodeB network, a home nodeB network and a pico cell. A pico cell is usually a wireless network that covers a very small area, typically indoors and in a commercial or public area. It uses 2G or 2.5 G (GSM/GPRS) wireless access. A home nodeB network is a 3G micro network that typically involves residential use, but does not have to. A home enodeB is a 4G micro network also typically configured for residential use. Applicant's invention is particularly well suited in these environments.

In one embodiment, the local area network is configured to connect with the wide area network via a broadband backhaul. Usage of IP is a decision based on a number of factors like the data rate needed, reusing existing infrastructure and the like. Advantageously, Applicant's invention can be used in connection with a backhaul network and/or can be used with existing available network.

In one embodiment, the second scanning interval is sufficient in the dormant mode to measure neighbor cell power in a wide area network.

The method 300 can include providing an automatic mode controller configured to switch to the active mode when at least one of: user activity is detected, the quiet time has not been entered and the determined quality of service from the local area network fails to meet the predetermined threshold. Advantageously, this feature automatically maintains the wireless communication device in an active mode, to allow a user to communicate as desired in the active mode. After a certain period and provided certain criteria are met, the wireless communication device can return to the quiet mode.

The method 300 can also provide an automatic mode controller configured to switch to the active mode when a user activity is detected including at least one of detecting a key press; detecting a touch screen press; detecting that a display is active; and detecting an incoming communication. Advantageously, this feature allows a user to communicate as desired in the active mode.

In one embodiment, the method 300 can provide an automatic mode controller wherein the wireless communication device is switched to the active mode when the device is connected to a charging device, such as at least one of an AC adaptor, a battery charger, and a host device. Advantageously, this feature maintains the wireless communication device in the active mode as desired.

In another embodiment, the method 300 can provide a user programmable dormancy mode scheduler for scheduling a quiet period. Thus, a user can set a timer or customize the device to enter the quiet time as desired, for minimizing power drain when minimal use is anticipated by the user, such as during normal sleeping hours, such as from twelve midnight to five am, for example.

In a preferred embodiment, the method 300 of saving energy in a wireless communication device capable of running on a wide area network and a local area network, comprises: operating 310 on a wide area network and a local area network, defining an active mode, wherein neighbor cell measurements are made at a first scanning interval; detecting 320 conditions to transition to a dormant mode, by: a) operating on the local area network comprising a priority home nodeB network; b) entering a scheduled quiet time; c) perceiving that a wireless communication is not in use; and d) determining a quality of service from the priority home NodeB network meets a predetermined threshold; and transitioning 330 to a dormant mode wherein the neighbor cell measurements are made at a second scanning interval, reduced from the first scanning interval. Also preferably, the wireless communication device is camped on a highest priority home nodeB on RPLMN. This method is compatible with many 3GPP standards including but not limited to 24.285 V 8.2.0 and TS 25.367 V8.2.0. This method can help minimize unnecessary power drain.

In its simplest form, a wireless communication device 200 capable of running on a wide area network and a local area network, is shown in FIGS. 1 and 2. The wireless communication device 200 can include: a housing 210; a controller 220 coupled to the housing 210, the controller 220 configured to control the operations of a wireless communication device; a transceiver 250 configured to operate on a wide area network and a local area network, defining an active mode, wherein neighbor cell measurements are made at a first scanning interval; a mode management module 290 configured to: detect whether conditions to transition to a dormant mode are met, including: operating on local area network, entering a scheduled quiet time, and determining a quality of service from the local area network meets a predetermined threshold; and transition to a dormant mode wherein the neighbor cell measurements are made at a second scanning interval, reduced from the first scanning interval. Advantageously, Applicant's invention can help to minimize unnecessary power drain of a wireless communication device and prolong the useful battery life of such a device.

In one embodiment, the mode management module 290 includes a processor 292 having an automatic mode wherein the device is switched to the active mode when user activity is detected. The wireless communication device can return or transition back to a dormant mode after a certain period of time, if certain criteria are met.

In a preferred embodiment, the mode management module 290 includes a processor 292 having an automatic mode configured to switch to the active mode when at least one of: user activity is detected, the quiet time has not been entered and the determined quality of service from the local area network fails to meet the predetermined threshold. Advantageously, this feature can maintain or switch the wireless communication device to the active mode, to allow a user to communicate as desired in the active mode.

In a preferred embodiment, the mode management module 290 includes a processor having an automatic mode configured to switch to the active mode when connected to a charging device, wherein the charging device is at least one of an AC adaptor, a battery charger and a host device. Advantageously, this feature maintains the wireless communication device in the active mode as desired.

In a preferred embodiment, the mode management module 290 includes a user programmable dormancy mode scheduler for scheduling a dormant mode period and a timer. Thus, a user can set or customize the device to enter the quiet time or dormant mode as desired, for minimizing power drain when minimal use is anticipated by the user.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

What is claimed is:

1. A method of saving energy in a wireless communication device capable of running on a wide area network and a local area network, comprising:
   operating, by the wireless communication device, on a wide area network and a local area network, defining an active mode, wherein neighbor cell measurements are made at a first scanning interval;
   detecting conditions to transition to a dormant mode, by:
      a) operating on the local area network,
      b) entering a scheduled quiet time, and
      c) determining a quality of service from the local area network meets a predetermined threshold; and
   transitioning to the dormant mode wherein the conditions to transition to the dormant mode are detected before the neighbor cell measurements are made at a second scanning interval, reduced from the first scanning interval.

2. The method of claim 1, wherein the local area network comprises at least one of a home eNodeB network, a home nodeB network and a pico cell.

3. The method of claim 1, wherein the local area network is configured to connect with the wide area network via a broadband backhaul.

4. The method of claim 1 wherein the second scanning interval is sufficient in the dormant mode to measure neighbor cell power in a wide area network.

5. The method of claim 1 further comprising providing an automatic mode controller configured to switch to the active mode when at least one of: user activity is detected, the scheduled quiet time has not been entered and the determined quality of service from the local area network fails to meet the predetermined threshold.

6. The method of claim 1 further comprising providing an automatic mode controller configured to switch to the active mode when a user activity is detected including at least one of: detecting a key press; detecting a touch screen press; detecting that a display is active; and detecting an incoming communication.

7. The method of claim 1 further comprising providing an automatic mode controller wherein the wireless communication device is switched to the active mode when the device is connected to a charging device.

8. The method of claim 1 further comprising programming a user programmable dormancy mode scheduler for scheduling a quiet period.

9. A method of saving energy in a wireless communication device capable of running on a wide area network and a local area network, comprising:
   operating, by the wireless communication device, on a wide area network and a local area network, defining an active mode, wherein neighbor cell measurements are made at a first scanning interval;
   detecting conditions to transition to a dormant mode, by:
      a) operating on the local area network comprising a priority home nodeB network,
      b) entering a scheduled quiet time,
      c) perceiving that a wireless communication is not in use; and
      d) determining a quality of service from the priority home NodeB network meets a predetermined threshold; and
   transitioning to the dormant mode wherein the neighbor cell measurements are made at a second scanning interval, reduced from the first scanning interval.

10. A wireless communication device capable of running on a wide area network and a local area network, comprising:
   a housing;
   a controller coupled to the housing, the controller configured to control operations of a wireless communication device;
   a transceiver configured to operate on a wide area network and a local area network, defining an active mode, wherein neighbor cell measurements are made at a first scanning interval; and
   a mode management module configured to:
      detect whether conditions to transition to a dormant mode are met, including:
         operating on local area network, entering a scheduled quiet time, and determining a quality of service from the local area network meets a predetermined threshold; and
      transition to the dormant mode wherein the conditions to transition to the dormant mode are detected before the neighbor cell measurements are made at a second scanning interval, reduced from the first scanning interval.

11. The wireless communication device of claim 10 wherein the local area network comprises at least one of a home eNodeB network, a home nodeB network and a pico cell.

12. The wireless communication device of claim 10 wherein the second scanning interval is sufficient in the dormant mode to receive communications from a wide area network base station.

13. The wireless communication device of claim 10 wherein the mode management module includes a processor having an automatic mode wherein the wireless communication device is switched to the active mode when user activity is detected.

14. The wireless communication device of claim 10 wherein the mode management module includes a processor having an automatic mode configured to switch to the active mode when at least one of: user activity is detected, the scheduled quiet time has not been entered and the determined quality of service from the local area network fails to meet the predetermined threshold.

15. The wireless communication device of claim 10 wherein the mode management module includes a processor having an automatic mode configured to switch to the active mode when connected to a charging device.

16. The wireless communication device of claim 15 wherein the charging device is at least one of an AC adaptor, a battery charger and a host device.

17. The wireless communication device of claim 10 wherein the mode management module includes a user programmable dormancy mode scheduler for scheduling a dormant mode period.

18. The wireless communication device of claim 10 wherein the mode management module includes a user programmable dormancy mode scheduler for scheduling a dormant mode period and a timer.

* * * * *

UNITED STATES PATENT AND TRADEMARK OFFICE
CERTIFICATE OF CORRECTION

PATENT NO. : 8,780,775 B2  
APPLICATION NO. : 13/070518  
DATED : July 15, 2014  
INVENTOR(S) : Sankaran C. Balasubramaniam et al.

Page 1 of 1

It is certified that error appears in the above-identified patent and that said Letters Patent is hereby corrected as shown below:

In the claims

Column 6, line 59 (Claim 10):     After "operating on" insert --the--.

Signed and Sealed this
Twenty-second Day of March, 2016

Michelle K. Lee
*Director of the United States Patent and Trademark Office*